United States Patent [19]
Svedberg et al.

[11] Patent Number: 5,408,218
[45] Date of Patent: Apr. 18, 1995

[54] MODEL BASED ALARM COORDINATION

[75] Inventors: Johan Svedberg, Stockholm; Göran Lindquist, Simrishamn; Weine Eriksson, Torna Hallestad, all of Sweden

[73] Assignee: Telefonaktiebolaget L M Ericsson, Stockholm, Sweden

[21] Appl. No.: 33,863

[22] Filed: Mar. 19, 1993

[51] Int. Cl.$^6$ .................... G08B 29/00; G06F 11/00
[52] U.S. Cl. ................... 340/507; 340/500; 340/825.16; 340/514; 371/16.5; 371/29.1
[58] Field of Search ............. 340/507, 514, 500, 525, 340/825.16, 825.06; 364/138, 141, 184, 186; 371/7, 16.5, 29.1, 48

[56] References Cited
U.S. PATENT DOCUMENTS

| | | | |
|---|---|---|---|
| 4,414,539 | 11/1983 | Armer | 340/514 |
| 4,777,473 | 10/1988 | Weston et al. | 340/514 |
| 4,962,368 | 10/1990 | Dobrzanski et al. | 340/514 |

Primary Examiner—Donnie L. Crosland
Attorney, Agent, or Firm—Johnson & Wortley

[57] ABSTRACT

A model-based alarm coordination system coordinates primary and secondary alarm notifications in order to ascertain whether they are caused by a single fault, or multiple faults, in a complex electrical system. The alarm coordination function is part of a larger overall Fault Management Support (FMS) system. The FMS system is a framework that, when combined with object-specific fault management parts, offers uniform fault management functions to managed objects (MOs) within the electrical system. Each MO is viewed as a self-contained, functional unit, and is responsible for its own internal fault management. Therefore, there are no global or centralized fault management functions. Object relation models, based on functional dependencies between objects, are used to automatically solve the alarm coordination problem which arises when a large number of faults are reported in response to a single fault which causes out-of-specification performance in many dependent objects. Little object-specific programming is required.

14 Claims, 6 Drawing Sheets

MODEL BASED ALARM COORDINATION

BACKGROUND OF THE INVENTION

1. Field of the Invention

A portion of the disclosure of this patent document contains materials which is subject to copyright protection. The copyright owner has no objection to the facsimile reproduction by anyone of the patent document or the patent disclosure, as it appears in the patent and trademark office, patent file or records, but otherwise reserves all copyrights whatsoever.

This invention relates to the implementation of a managed object system for monitoring the operation of complex electrical systems and isolating faults therein. In particular, it relates to the generation, control, and propagation of alarm conditions within a telecommunications network.

2. Description of Related Art

Today's complex telecommunications systems have thousands of functional elements which are interdependent in their operation. When a fault occurs in one of the functional elements, the fault must be detected, and the faulty element must be isolated for replacement or repair. With thousands of such elements in modern telecommunications systems, it is not economically feasible to perform such monitoring and fault isolation functions manually. For this reason, automated performance monitoring and fault isolation systems have been developed.

In general, when a fault or a malfunction is detected in an electrical system, the system puts out an alarm to the operator or operation support system that is managing the system. If the system has many elements or managed objects (MOs), there may be a chain of functional dependencies between the various MOs. In such a case, multiple alarms may be generated by a single fault, and the need for alarm coordination arises. For example, if an object A is faulty, it should obviously send an alarm notification to the operation support system. If an object B is functionally dependent on object A, and object A is faulty, object B may also be non-functional and should send an alarm notification as well. This, of course, results in two alarm notifications caused by a single fault.

In most cases involving complex telecommunications systems, multiple objects, rather than the illustrative single object B, will be dependent upon object A. If $B_n$ denotes all objects that are functionally dependent upon object A, there may also be objects $C_{m,n}$ that are functionally dependent upon object $B_n$ and so on. In such complex systems, one fault may be detected nearly simultaneously with, or independently of other detections of the same fault, in different parts of the system. A serious fault in object A may create malfunction symptoms in a great number of the B and C objects, which then report the malfunctions by sending alarm notifications. If the number of notifications is great, the system experiences a mass alarm situation. The operator or the operation support system, in the case of a mass alarm situation, may be flooded with information. The vast amount of information makes it difficult to take proper corrective action in a reasonable time.

For existing systems, the solution to the problem described above is for the operation support system to post-process the mass of alarm notifications. Each network element or managed object sends alarm notifications as they occur for any abnormalities that are detected. The operation support system attempts to store the alarm notifications until all notifications resulting from a particular event are generated and received. They are then processed off-line to determine the cause of the mass alarm situation. This approach requires, in the case of complex telecommunication systems, an expensive, high capacity management system with an accurate model of the supervised electrical system. Even if the operation support system can handle the large number of alarms, the telecommunications system remains inoperative or degraded until the post processing can be completed and the cause of the problem identified and corrected.

In telecommunications systems, mass alarm conditions often lead to the failure of the high capacity management systems, and experienced trouble shooters are required to manually isolate the fault and effect repairs. Such failures lead to increased cost of operation and increased amounts of down time of the telecommunications system.

Therefore, it would be a distinct advantage within the telecommunications industry to have a model-based alarm coordination system which is more intelligent in its reporting of detected malfunctions in order to avoid mass alarm situations. The system of the present invention provides such a system.

SUMMARY OF THE INVENTION

In one sense, the present invention is a model-based alarm coordination system for controlling the reporting of faults in complex electrical systems having a plurality of managed objects. The coordination system detects out-of-specification performance in the plurality of managed objects and differentiates between managed objects which have out-of-specification performance due to internal faults, and managed objects which have out-of-specification performance due to faults in other managed objects. The managed objects with internal faults are then localized.

In another aspect, the present invention is a model-based alarm coordination system for identifying and localizing faults in complex electrical systems having a plurality of managed objects. The coordination system generates primary alarm notifications within those managed objects which are fault-causing, and secondary alarm notifications within those managed objects which are not fault-causing, but which are affected by the fault-causing managed objects. The system also generates requests to coordinate the primary and secondary alarm notifications, and requests to localize the fault-causing managed objects. Additionally, fault identification messages are generated within the managed objects in response to the sensing of faults by the managed objects. The fault identification message then identifies the generating managed object and the type of fault sensed. The system further establishes dependency relationships between the managed objects, and transmits the fault identification messages from managed objects which are sensing faults to the managed objects with which the dependency relationships exist. The fault identification message is transmitted in conjunction with the primary alarm notifications, secondary alarm notifications, requests to coordinate, and requests to localize.

In still another aspect, the present invention includes a method for controlling the reporting of faults in complex electrical systems having a plurality of managed objects. The method comprises detecting out-of-specification performance in the plurality of managed objects and differentiating between managed objects which have out-of-specification performance due to internal faults, and managed objects which have out-of-specification performance due to faults in other managed objects. The managed objects with internal faults are then localized.

In yet another aspect, the present invention includes a method for identifying and localizing faults in complex electrical systems having a plurality of managed objects. The method comprises generating primary alarm notifications within those managed objects which are fault-causing and generating secondary alarm notifications within those managed objects which are not fault-causing, but are affected by the fault-causing managed objects. Requests to coordinate the primary and secondary alarm notifications and requests to localize the fault-causing managed objects are generated within the managed objects as well as fault identification messages which are generated within the managed objects in response to the managed objects sensing a fault, where the fault identification message identifies both the generating managed object and the type of fault sensed. Dependency relationships are established between the managed objects and fault identification messages are transmitted from managed objects sensing faults to managed objects with which the dependency relationships exist, where the fault identification message is transmitted in conjunction with the primary alarm notifications, secondary alarm notifications, requests to coordinate, and requests to localize.

It is an object of the present invention to provide the user with the capability to couple fault/fault symptom alarms to the faulty unit, thereby making it possible for the user to trace the actual fault and take corrective action.

It is another object of the invention to assemble and present coordinated alarms to the receivers in a consistent manner.

It is still another object of the invention to automatically and unequivocally localize faults in the system to a single replacement unit including both hardware or software.

It is still yet another object of the invention to identify faults in the system by a unique fault identification message which consists of a reference to the faulty managed object, fault number, alarm type, and problem type. All primary and secondary alarm notifications generated by a fault contain the same fault identification message.

It is another object of the invention for all managed objects affected by the same fault to store an identification of the fault which may be retrieved by the operator.

Through the above, the operator may more easily determine the consequences of a fault. Additionally, uniform fault management and alarm reporting is achieved throughout the system. Although the system and method of the present invention provides a decentralized fault-management scheme, it may be combined with more traditional centralized fault management systems, thus increasing their capability and flexibility.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION

The system of the present invention is a model-based alarm coordination system which coordinates primary and secondary alarm notifications in order to ascertain whether they are caused by a single fault, or multiple faults, in a complex electrical system. The alarm coordination function is part of a larger overall Fault Management Support (FMS) system. The FMS system is a frame work that, when combined with object-specific fault management parts, offers uniform fault management functions to managed objects (MOs) within a complex electrical system such as a telecommunications system. Each MO is viewed as a self-contained, functional unit, and is responsible for its own internal fault management. Therefore, in the present system there are no global or centralized fault management functions.

The present system for alarm coordination provides designers and programmers of telecommunication systems with a frame work for defining functional dependencies between objects. These object relation models are used to automatically solve the alarm coordination problem in a generalized and standardized way. Relatively little object-specific programming is required.

The FMS system consists of three parts: an operation support system (OSS), fault handling support, and repair handling support. The OSS provides overall management support and an interface for human operators. Fault handling support performs the functions of alarm coordination, fault localization, and alarm information packing. Repair handling support controls the repair process for hardware units by performing multiple functions which enable component replacement without expert skills. Repair handling support is not a subject of this patent.

Figure 1:
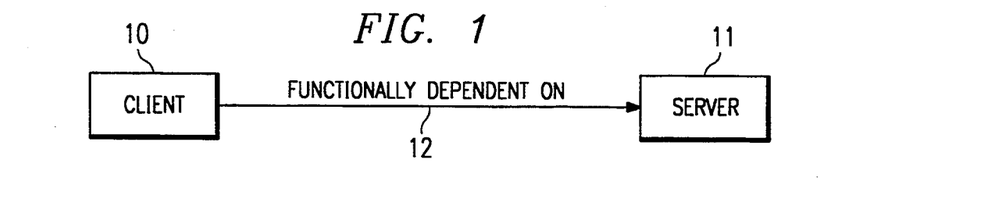
FIG. 1 is a block diagram illustrating the manner in which relationships between managed objects (MOs) are established, when one object is functionally dependent on the other, within the model that is part of the system of the present invention.

Model-based alarm coordination is required when a single fault triggers multiple fault notifications due to the relationships between various MOs in the electrical system. In a complex system, such as a telecommunications exchange, the functional elements are stratified, and as previously noted, objects from different levels may be functionally related. As shown by the illustration in FIG. 1, two roles in the relationship are identified: the client 10 and the server 11, where the client 10 is functionally dependent on the server 11. One of the consequences of this dependency relationship 12 is that the operational state of the server 11 is propagated to its clients 10. For example, when the server 11 is blocked (its operational state has changed to disabled), the client 10 is said to be secondarily blocked.

Figure 2:
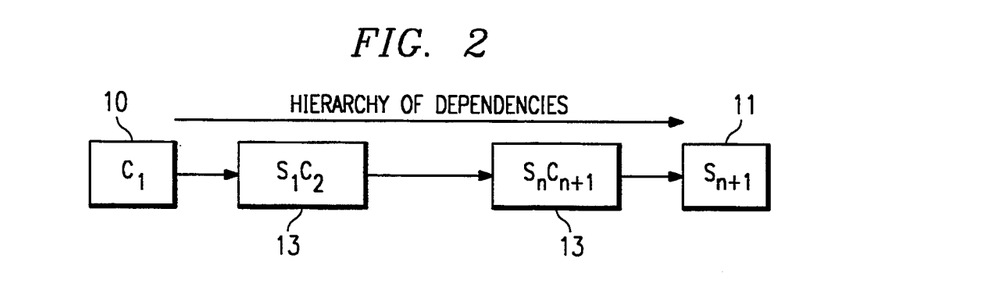
FIG. 2 is a block diagram illustrating a hierarchy of dependencies between MOs in a complex electrical system through which the operational or alarm state is propagated in accordance with the teachings of the present invention.

FIG. 2 is a block diagram illustrating a hierarchy of dependencies between MOs in a complex electrical system through which the operational or alarm state is propagated in accordance with the teachings of the present invention. When there is a hierarchy of dependencies, there is a hierarchy of client/servers 13, where the servers on one level are clients to servers on the next level and so on. Most complex electrical systems contain such hierarchies of dependencies.

Figure 3:
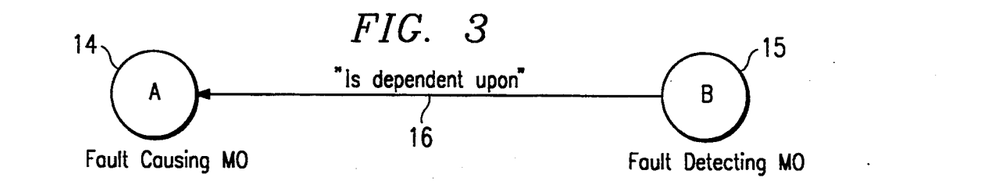
FIG. 3 is a block diagram illustrating a dependency relationship between fault-causing objects and fault-detecting objects in one embodiment of the system of the present invention.

FIG. 3 is a block diagram illustrating a dependency relationship between a fault-causing object A 14 and a fault-detecting object B 15 in one embodiment of the system of the present invention. The relationship "Is Dependent Upon" 16 means that object B is dependent upon object A to maintain its operability. The "Is Dependent Upon" relationship 16 is used to propagate information between the objects 14 and 15. The information transferred is mainly fault identification messages denoting the nature and location of the actual fault. These fault identifications are then used by the alarm notifications. Secondary alarm notifications for the symptoms contain the same fault identification as the primary alarm notification for the fault cause.

In most complex electrical systems, multiple objects ($B_n$) are functionally dependent upon object A, therefore, multiple alarm notifications are generated when object A fails. The system of the present invention coordinates the respective alarm notifications with each other so that it is clear to the operation support system that the alarm notification from $B_n$, and each object between $B_n$ and object A, is a consequence of object A's alarm. This coordination is based on two conditions:

1. Fault management functions are distributed in the different managed objects. Each MO implements its part of the fault management scheme; and
2. If an MO is functionally dependent on another MO, the nature of that relationship is established in a model between the objects.

Coordination is mainly a matter of informing involved objects about the fault identity. Alarm coordination is thus implemented by propagation of fault identifications between MOs. The effect of the propagation is to link faults and their symptoms to each other in order to tell that they are caused by the same fault in the system. The fault identification is created by the fault-causing MO and is stored in all affected MOs. Alarm coordination uses relationship references, mainly the "Is Dependent Upon" relationship, but also, the "Is Handled By" relationship (described later), to communicate between MOs. The "Is Dependent Upon" relationship is bi-directional because a fault coordination function uses one direction and a fault localizing function uses the other.

In one embodiment an ELIN[1]-specification is used to specify the "Is Dependent Upon" relationship. In the following example, RefClient and RefServer are used to denote two reference attributes, one from each object in the relationship, although other names may be used:

---
ELIN-specification:
PERSISTENT ADT Server
    BASE Cofms_FHSupport;
. . .
    ATTRIBUTES
. . .
    RefClient: REFERENCE MANY TO Client
        INVERSE RefServer;
. . .
END ADT Server;
PERSISTENT ADT Client
    BASE Cofms_FHSupport;
. . .
ATTRIBUTES
. . .
    RefServer: REFERENCE TO Server
        INVERSE RefClient;
. . .
END ADT Client;
© 1993 Telefonaktiebolaget L M Ericsson
---

[1] ELIN is a programming language especially developed for telecommunications systems and is described in the publication entitled "ELIN REFERENCE MANUAL", attached as Appendix A to copending patent application entitled "System for Dynamic Run-Time Binding of Software Modules in a Computer System", filed Jul. 1, 1992, Ser. No. 07/907,307 by Kenneth Lundin et al., hereby incorporated by reference herein.

In this example, a one-to-many cardinality is specified, but other cardinalities may be specified by inserting or omitting the keyword MANY. The keyword INVERSE indicates that the "Is Dependent Upon" relationship is bi-directional, as indicated above.

If a fault occurs, it may be detected either by the object in which the fault resides or by a functionally dependent (client) object. The most common case is that in which the fault is first detected in the server object actually causing the problem. Referring again to FIG. 2, this object is labelled $S_{n+1}$. The following measures are taken in the object $S_{n+1}$ in the normal case wherein its internal error detection function determines a fault:

1. Primary protection is initiated. If the operational state of $S_{n+1}$ is "enabled," it is set to "disabled." If the operational state is already in the disabled position, it remains there.
2. A self test is performed to determine the precise cause of the problem. If, however, the self test cannot find an internal object fault, or if the test indicates that the problem is with one of its servers, the need for fault localization arises.
3. A fault identification message is generated which is unique to the fault identified.
4. The operational state of $S_{n+1}$ is propagated all the way up to $C_1$. A list of references to all secondarily blocked objects may be maintained during the propagation transaction and may then be associated with $S_{n+1}$.
5. An alarm notification is generated which includes the list of secondarily blocked objects.

Any object that receives the message that one of its servers is disabled will perform these same activities.

As mentioned above when an object's internal error detection function determines a fault, the object's operational state may already be in the disabled condition. This may be caused by a fault identification propagation from one of its servers. In this case the primary protection phase is entered in an already secondarily blocked object. This may have one of two explanations:

1. The detected secondary blocking is due to a fault identification propagation from one of its servers; or
2. The detected secondary blocking is due to another, potentially historical, problem.

The object must, through its own internal fault detection function, determine which explanation is correct. This is done by a functional self test. If the functional self test finds a fault in this object, it is a new fault, and the object's operational state is set to "primary disabled" which starts a new chain of propagation. If the self test provides no evidence of internal faults, the system determines whether or not there is a new fault in another object which is causing the secondary blocking, or whether the secondary blocking is, in fact, caused by the fault which the fault identification message indicates. This again raises the need for fault localization.

Figure 4:
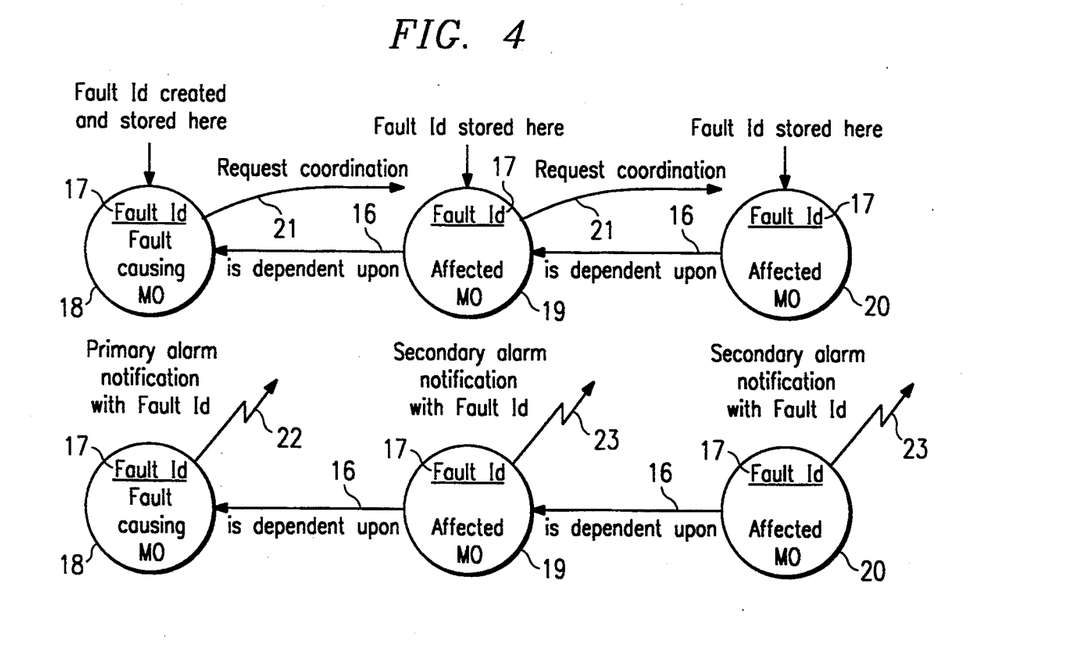
FIG. 4 is a block diagram illustrating a method by which fault identification messages, alarm notifications, and "time-out" localization determinations are propagated throughout an electrical system in one embodiment of the system of the present invention.

FIG. 4 is a block diagram illustrating a method by which fault identification messages, alarm notifications, and "time-out" localization determinations are propagated throughout an electrical system in one embodiment of the system of the present invention. It can be seen that a fault identification message 17 is created and stored within the fault-causing MO 18. The fault identification message 17 is included in a coordination request 21 which is propagated to all functionally dependent MOs 19, 20, where the fault identification 17 is stored. Concurrently, the fault-causing MO sends out a primary alarm notification 22. Secondarily affected MOs 19, 20 send out a secondary alarm notification 23 which includes the fault identification message 17. The coordination of related MOs is achieved by propagating requests along dependency relationship lines 16 between the MOs, and storing the same fault identity 17. The coordination of alarm notifications 22, 23 is accomplished by including the same fault identity 17 in the alarm information.

Figure 5:
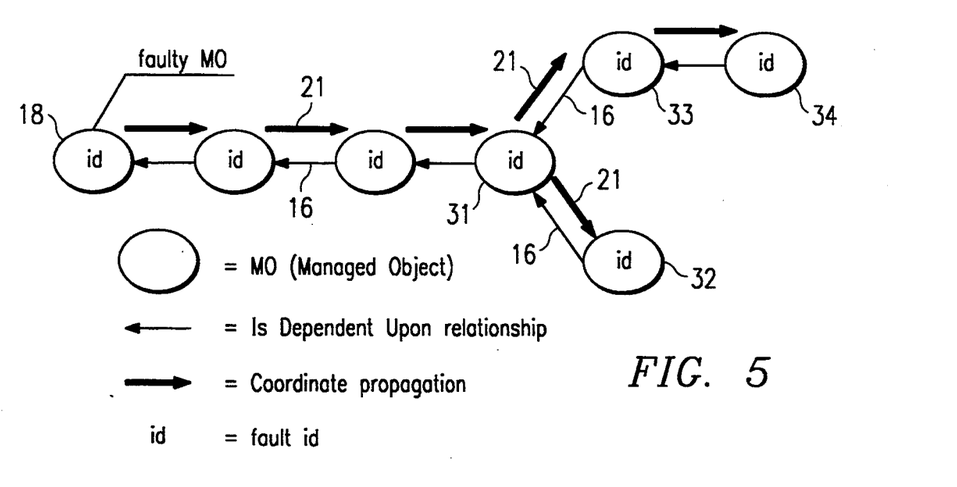
FIG. 5 is a block diagram illustrating the propagation of a coordination request along dependency lines and through multiply dependent objects in accordance with the teachings of the present invention.

FIG. 5 is a block diagram illustrating the propagation of a coordination request 21 along dependency lines 16 and through multiple dependent objects. It can be seen that an MO 31 with multiple lines of dependency 16 propagates the coordination request 21 along all lines to dependent MOs 32-34.

As discussed above, the need for fault localization arises when the self test of an MO determines that the fault is outside of that object. The fault is then known to exist in one or more of that object's servers, but a specific server is unknown. There are two ways in which to locate the faulty server. The two methods may be used independently, or the methods may be combined.

The first method is a "time-out" method of localizing a faulty MO, and is also illustrated by FIG. 4. As a design specification, any MO in the electrical system that develops a fault for any reason must detect that fault within a specified time, $\tau_1$. The time for propagation of a fault identification message from server objects to a particular MO is designated by K, and may be estimated. If an MO 20 performs a self test and determines that the problem is outside the object, then a propagated secondary blocking (coordination request) 21 will arrive within a certain time period $\tau_2$, where $\tau_2 = \tau_1 + K$. Therefore the system waits for a time $\tau_2$, and if no propagation has arrived at the MO 20, the system has "timed out," and the affected MO 20 generates an alarm notification. The alarm notification may not point out the specific faulty server object 18, but it indicates that the fault resides in a server object 18, 19 for this particular MO 20.

Alternatively, if no server objects 18, 19 for this MO 20 are reporting faulty, the secondary alarm notification 23 from this MO may be seen by the operation support system as an indication that this MO's self test is insufficient, and that a primary alarm should be sent. If, however, the propagation 21 arrives within the stipulated time, $\tau_2$, it may continue through the hierarchy and result in an appropriate alarm notification in due time.

Figure 6:
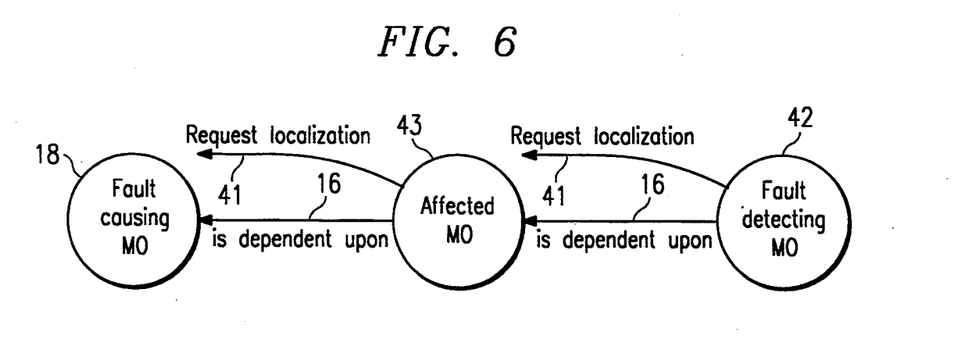
FIG. 6 is a block diagram illustrating a recursive fault localization scheme utilized in one embodiment of the system of the present invention through which it is determined which server object in an electrical system is faulty.

The second method of isolating which server object is faulty is through a recursive fault localization scheme as shown in FIG. 6. By using the same relationship references 16 as in the coordination case to communicate between objects, the faulty server 18 can be located by implementing a recursive localize propagation 41 requesting the next MO up the chain of MOs 40 to perform a functional check and report its operability. Starting with the fault-detecting MO 42, each object 43 in the chain 40 performs a self test, and if it finds itself affected but not faulty, it questions the next object in the chain.

Figure 7:
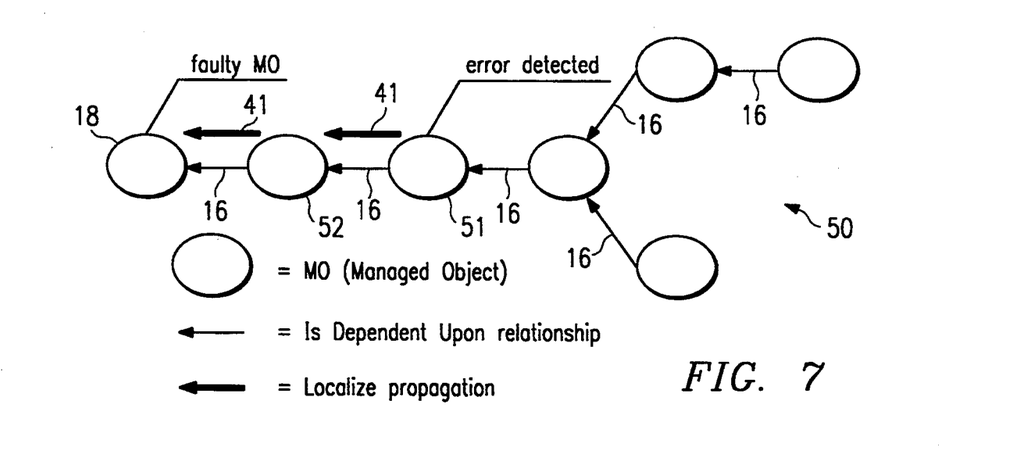
FIG. 7 is a block diagram illustrating a representative chain of MOs along with their dependency relationships and propagation of a localize function.

FIG. 7 is a block diagram illustrating a representative chain of MOs 50 along with their dependency relationships 16 and propagation of a localize function 41. The propagation 41 starts with the fault-detecting MO 51 and proceeds along the "Is Dependent Upon" relationship 16 to server MOs 52 and 18. Eventually there is an object 18 that may be pointed out as faulty either by the answer from the object's self test or if the next object up the chain is not affected. The fault-causing object 18 usually detects the fault itself, but there are cases where other objects detect symptoms prior to the causing object. Fault localization takes care of these situations as well as the case when several objects detect symptoms at the same time.

Several interfaces operate within the fault management system (FMS) to coordinate the activities of the fault handling support function of the FMS. The following interfaces are present:

1. Fault Handling Management Interface (FH-MI). This interface between fault handling support and the operation support system (OSS) provides the capability for an operator to configure the fault handling support function. Through the FH-MI interface, the MOs may be configured to stop the sending of secondary alarm notifications. The contents of some alarm notifications may also be changed.

2. Fault Handling Object Programmer's Interface (FH-OPI). This interface is used to indicate that a fault/fault symptom has been detected or that a fault situation has been cleared. By using this interface, primary and secondary alarms are coordinated, and an unequivocal view of the alarm situation is provided at the management level. Support for collecting alarm event information is provided in order to report alarm events with consistent contents and format.

3. Fault Handling—Propagation Interface (FH-PropI). This interface is used to send requests for localization and coordination between MOs. The purpose of the messages are to locate the faulty MO and to coordinate MOs affected by the same fault.

Fault handling support performs the functions of alarm coordination, fault localization, and alarm information packing. The fault handling function is primarily aimed at supporting the implementation of interface functions with the operation support system; it is not supporting object-specific internal fault handling. Fault handling support provides general support for all types of managed objects, and may be used for both hardware and software faults.

The Fault Handling—Propagation Interface (FH-PropI), as noted above, is used to send requests for localization and coordination between MOs. The purpose of the messages are to locate the faulty MO and to coordinate MOs affected by the same fault. FH-PropI uses four messages to accomplish its functions: Localize, Coordinate, Not Faulty, and Clear Fault. The Localize message 41 (FIG. 6) is sent from a dependent MO to a server MO, and directs the server MO to take part in a localizing activity aimed at finding a faulty MO. The sending MO is not fully operational, but does not consider itself as being faulty. The response to a Localize message is either a Coordinate or a Not Faulty message.

The Coordinate message 21 (FIG. 4) is sent from a server MO 18 to a dependent MO 19, 20, and tells the receiving MO that the faulty MO 18 is found and, if the receiving MO's operability is affected, it should be coordinated with other affected MOs. The MOs are coordinated by storing the same fault identification 17 in each. The fault identification is included as an argument in the Coordinate message 21. There is no responding message to a Coordinate message.

The Not Faulty message is also sent by a server MO to a dependent MO in response to a Localize message 41. It tells the receiving MO that the sending MO is fully operational and is not affected by any fault. There is no responding message to a Not Faulty message.

The Clear Fault message is sent by a server MO to a dependent MO when the sending MO is fully operational after having been affected by a fault. There is no responding message to a Clear Fault message.

Fault handling support may be sub-divided into the following parts:

1. FHSupport Program. This program implements the functions of localization of faulty MOs, coordination of affected MOs, updating of the fault state, and sending of alarm notifications. The FHSupport Program is described in more detail in conjunction with FIG. 12 below.

2. FHSupport Propagations. This program implements propagation services for the coordinate and the localize functions. It utilizes the interface FH-PropI to send and receive fault messages between related MOs. The FHSupport Propagations program is described in more detail in conjunction with FIG. 16 below.

3. FHSupport State Handler. This program stores fault status information and reflects this status in the MO state. It combines MO-specific status information with general MO status information required from all MOs. The FHSupport State Handler program is described in more detail in conjunction with FIG. 17 below.

4. FHSupport Alarm Handler. This program collects the information needed for alarm notifications, and sends the notifications to a notification handler.

The fault-causing object usually detects the fault itself, but there are cases where other objects detect symptoms prior to the causing object. Fault localization takes care of these situations as well as the case when several objects detect symptoms at the same time. Faults in the electrical system are always automatically and unequivocally localized to a single replacement hardware or software unit.

The alarm information packing function collects the error detection information needed to create an alarm notification. Alarm notifications include a unique fault identity which enables the faulty MO to be localized and repaired. The information included in the fault identity is referred to as "attributes," and may be specified in a list of attributes supplied by the fault handling support function. The attributes defined by fault handling support are Event Type, Probable Cause, Severity, Threshold Info, Proposed Repair Action, Problem Text, and Problem Comment. Event Type, Probable Cause, and Severity are mandatory attributes which must be reported by each MO; the rest are optional. Additional attributes may be programmed in a specific MO to complement this list. All alarm notifications created or utilized by the present invention comply with the specifications of the CCITT and ANSI T1M1 standards for fault management and managed object modelling.

The mandatory attribute Event Type tells what type of alarm event was detected, and may comprise one of the following sub-attributes: Communication Alarm, Quality of Service Alarm, Processing Error Alarm, Equipment Alarm, or Environmental Alarm.

The mandatory attribute Probable Cause is used to further refine Event Type, and may comprise one of the following sub-attributes: Loss of Signal, Framing Error, Local Transmission Error, Remote Transmission Error, Call Establishment Error, Response Time Excessive, Queue Size Excessive, Bandwidth Reduced, Retransmission Rate Excessive, Reduced Reliability, Storage Capacity Problem, Version Mismatch, Corrupt Data, CPU Cycles Limit Exceeded, Software Error, Out of Memory, Power Problem, Timing Problem, Trunk Card Problem, Line Card Problem, Processor Problem, Terminal Problem, Data Set Problem, External Interface Device Problem, Multiplexer Problem, or Switch Problem.

The mandatory attribute Severity is used to indicate the importance of an alarm event, and may comprise one of the following sub-attributes: Indeterminate, Critical, Major, Minor, Warning, and Clear.

The optional attribute Threshold Info contains information when the detection is the result of a threshold crossing, and may indicate whether an upper or a lower threshold value was crossed. The optional attribute Proposed Repair Action is used when the system is able to suggest a solution. The optional attribute Problem Text provides a free-form text description of the problem detected.

Error detections are modelled in the MO that represents the supervised resource, not the supervising resource. For example, when a computer hardware unit is executing software that supervises a signalling link, a failure of the link is reported as an error detection in the link MO, not in the software or hardware MOs.

The operation support system receives the alarm notifications and uses them for purposes such as:

1. Initiating repair actions such as replacing the faulty equipment indicated in the alarm notification;
2. Initiating network reconfiguration. If an alarm notification indicates a malfunctioning line of communication, the management system may change routing information in the network in order to bypass the faulty line; and
3. Building a database. The management system may be designed to merely record the status of the various communications lines for future analysis.

The alarm coordination components of each MO are separated into two parts. A general part comprises components that are common to all MOs. An application part is an object-specific part for that particular MO. The application part of an MO monitors the MO and detects internal faults. Events that affect the status of the MO are reported to the general part using methods for error detection and error clearance.

Figure 8:
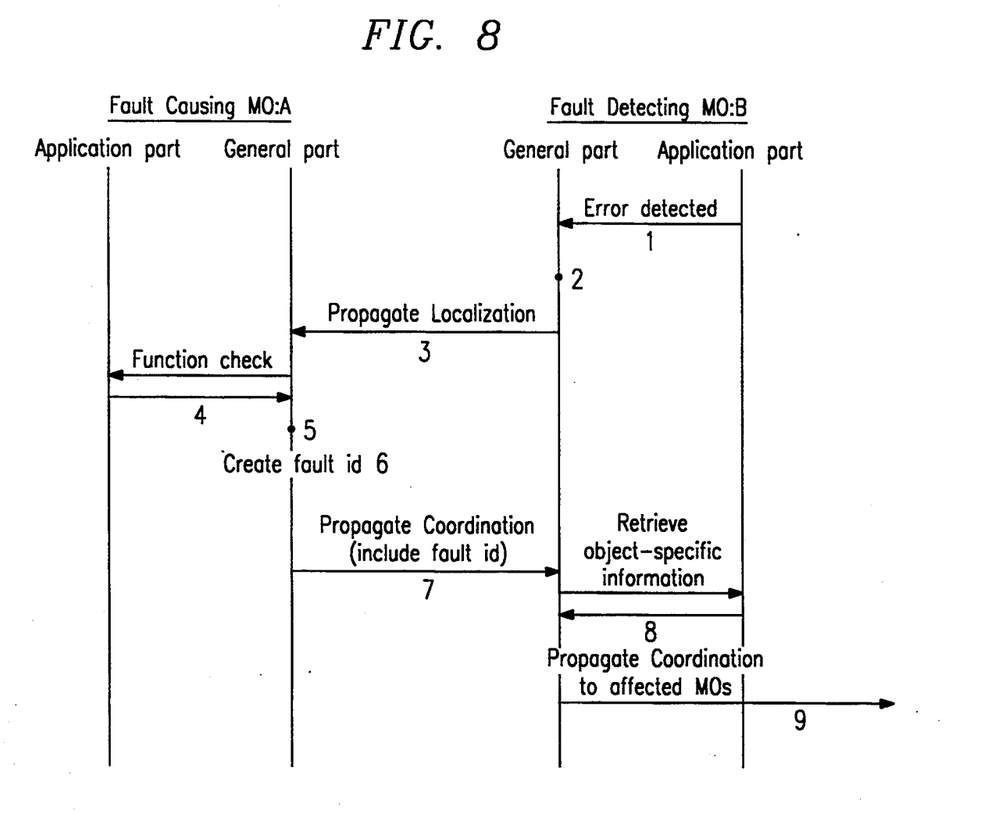
FIG. 8 is a graphical illustration of the interaction between MOs and between application parts and general parts of MOs when a fault has been discovered, in one embodiment of the system of the present invention.

FIG. 8 is a graphical illustration of the interaction between MOs and between application parts and general parts of MOs when a fault has been discovered, in one embodiment of the system of the present invention. In this example, managed object B is not the fault-causing MO, but first detects the fault in the system. Object B is served by a managed object A, which is the fault-causing MO. The following steps are taken:

1. The application part of object B detects a fault and starts the localization process by activating the general part of object B and calling an FHSupport method, "error Detected". The operability of object B is indicated in the call as well as an indication of whether object B is considered the fault-causing MO. The operability is expressed by stating whether object B is completely inoperable, has degraded capacity or service, or the operability cannot be decided.
2. The operational state of object B is changed to disabled.
3. Since object B is not the fault-causing MO, a "localization of faulty MO" function is started by the general part of object B, and a request for localization is propagated to the general part of object A, the MO on which object B is functionally dependent.
4. The general part of object A calls a "Function Check" method in the application part of object A and requests a function check which indicates that the services or the functionality of A are inoperable and fault-causing.
5. The operational state of A is changed to disabled to indicate the result of the function check.
6. The general part of object A calls a "Object NotifInfo" method from the application part of object A and retrieves object-specific information (attributes) from the application part. This information is used to create and store a fault identification message representing the fault.
7. The general part of object A sends a primary alarm notification and a coordination request, including a fault identification message, to the general part of all MOs that are functionally dependent upon object A, in this case, object B. The functionally dependent MOs are determined by calling a "Get Dependent Upon Objects" method in the application part of object A.
8. The general part of object B calls a "Object NotifInfo" method from the application part of object B and retrieves object-specific information (attributes) from the application part.
9. The general part of object B calls a "Get Dependent Upon Objects" method in the application part of object B. If other MOs are dependent upon object B, the general part of object B sends a secondary alarm notification, and relays the coordination request, with fault identification message, to these objects.

The interface provided by the general part is used by the application specific part to indicate that a fault/fault symptom has been detected or that a fault situation has been cleared. By using this interface, primary and secondary alarms are coordinated with each other, and an unequivocal view of the alarm situation is shown at the management level.

Figure 9:
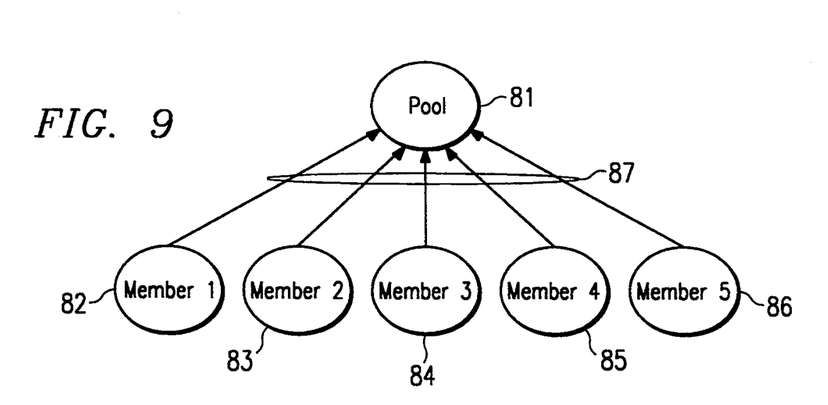
FIG. 9 is a block diagram illustrating a "pool" MO and its relationship with pool members in one embodiment of the system of the present invention.

FIG. 9 is a block diagram illustrating a "pool" MO 81 and its relationship with pool members 82–86 in one embodiment of the system of the present invention. Pools are often used to provide redundancy in an electrical system. In some instances, a single MO, referred to as a pool 81, will handle or manage several MOs, referred to as pool members 82–86. An "Is Handled By" relationship 87 is modelled between the MO representing the pool resource 81 and the MOs representing the pool members 82–86. The pool 81 may obtain the resources it needs to serve its members 82–86 from several different sources, but this is invisible to the members.

The relationships between the pool and its members must be modelled correctly for the coordinate function 21 and localize function 41 to operate as specified. If the modelling is not correct, primary alarm notifications may be sent from the wrong MO or may be sent with erroneous notification information.

"Is Handled By" relationships 87 are specified similarly to "Is Dependent Upon" relationships 16. The cardinality of the relationship is always one pool-to-many members, although a pool may actually be in relationships with zero, one, or more members. A member, however, may be related to only one pool MO.

The following is an example of an ELIN-specification used to specify the "Is Handled By" relationship 87:

```
ELIN-Specification:
PERSISTENT ADT Pool
    BASE Cofms_FHSupport;
    ...
    ATTRIBUTES
    ...
        RefMember: REFERENCE MANY TO Member
            INVERSE RefPool;
    ...
END ADT Pool;
PERSISTENT ADT MemberType
    BASE Cofms_FHSupport;
    ...
    ATTRIBUTES
    ...
        RefPool: REFERENCE TO Pool
            INVERSE RefMember;
    ...
END ADT Member;
© 1993 Telefonaktiebolaget L M Ericsson
```

A situation similar to the handling of many member MOs by a pool MO is when several MOs in the electrical system are dependent upon an external resource. In such a situation, the external resource may be modelled as an MO. If the outside resource is not modelled, its failure would appear as several independent faults in the MOs which are dependent upon it. Once the outside resource is modelled, the fault handling support function coordinates it to a single fault situation.

Figure 10:
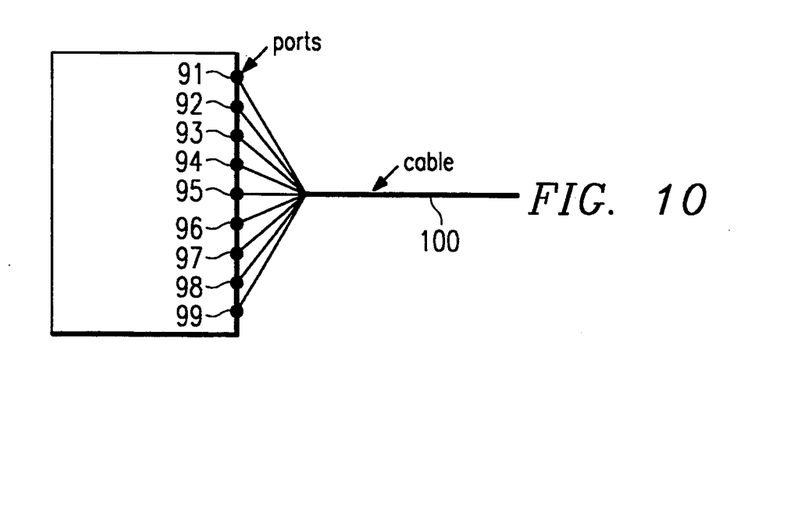
FIG. 10 is a block diagram illustrating a portion of a complex electrical system where many internal MOs are functionally dependent upon a single external resource in the system of the present invention.

FIG. 10 is a block diagram illustrating a portion of a complex electrical system where many internal MOs are functionally dependent upon a single external resource in the system of the present invention. In this example, several ports 91–99 use the same external cable 100 to connect to another network element (not shown). Since there may not be any explicit relationship between the ports 91–99, a failure of the cable 100 would lead to independent primary fault notifications from each of the ports 91–99 unless the cable 100 is modelled as an MO.

Figure 11:
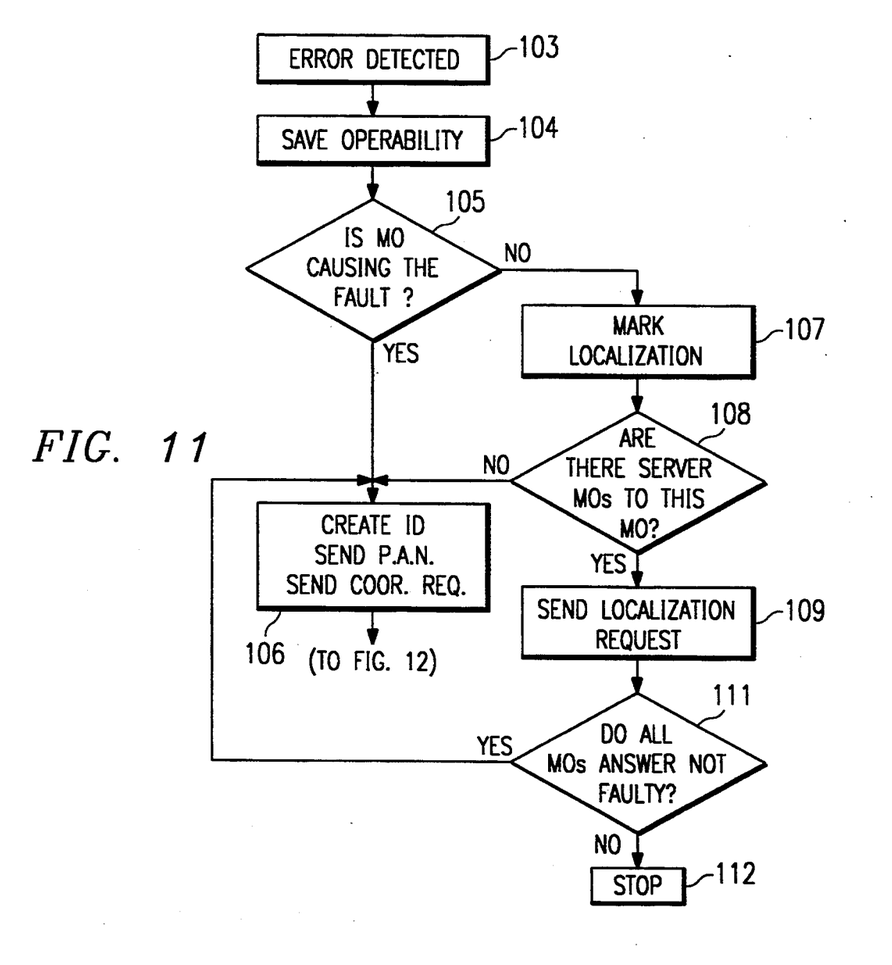
FIG. 11 is a flow chart of an FHSupport Program which implements the functions of localizing faulty MOs, coordinating affected MOs, updating of MO fault states, and sending of alarm notifications in one embodiment of the system of the present invention.

FIG. 11 is a flow chart of an FHSupport Program which implements the functions of localizing faulty MOs, coordinating affected MOs, updating of MO fault states, and sending of alarm notifications in one embodiment of the system of the present invention. The program is entered at step 103 when an error detection message is received in an MO.

The program moves to step 104 where the operability is saved in the MO fault state. The program then moves to step 105 where it is determined whether or not this MO is causing the fault. If this MO is causing the fault, the program moves to step 106 where the MO creates a unique fault identification, sends a primary alarm notification, and sends a coordinate request to functionally dependent MOs. The steps performed by the functionally dependent MOs are shown in the flow chart in FIG. 12.

If, however, at step 105 it was determined that the MO is not faulty, the program moves to step 107 where localization is marked in the MO fault state. The program next moves to step 108 where it determines whether or not there are server MOs to this MO. If there are no server MOs, then this MO becomes the fault-causing MO, and the program returns to step 106. If, however, at step 108 it was determined that there are server MOs to this MO, then the program moves to step 109 where a localization request is sent to the server MOs. The program then moves to step 111 where it is determined whether or not all server MOs answered Not Faulty. If they did not, the program moves to step 112 and stops. If they did, the program returns to step 106. The steps performed by the server MOs are shown in the flow chart in FIG. 13.

Figure 12:
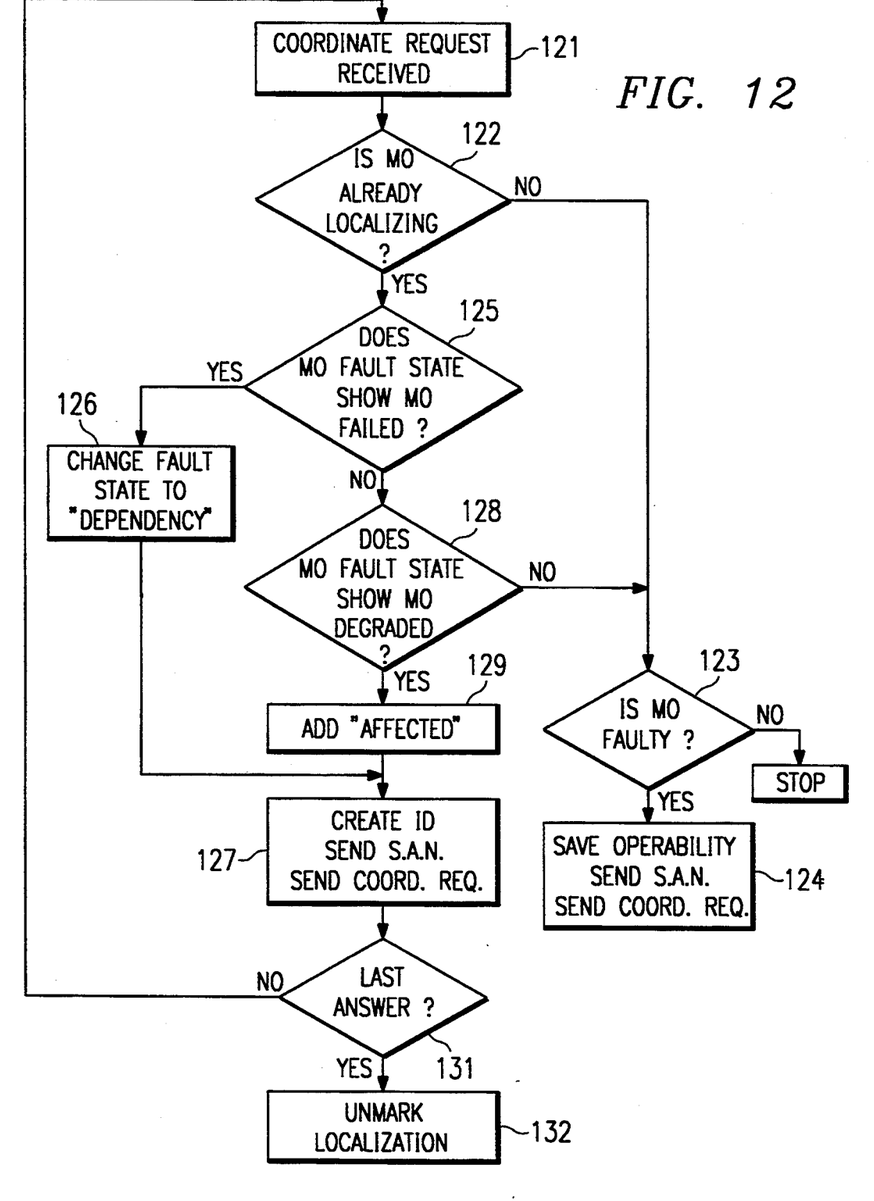
FIG. 12 is a flow chart illustrating the actions performed by a functionally dependent MO upon receiving a coordinate request from a server MO in one embodiment of the system of the present invention.

FIG. 12 is a flow chart illustrating the actions performed by a functionally dependent MO upon receiving a coordinate request (from step 106 in FIG. 11) from a server MO, at step 121. At step 122, the program determines whether or not this MO is already involved in the localization of the faulty MO. If it is not already involved, the program moves to step 123 where it is determined whether or not this MO is faulty. If the MO is not faulty, then no action is taken. If, however, the MO is faulty, the program moves to step 124 where the MO saves the operability in the MO fault state, sends a secondary alarm notification, and sends a coordinate request to functionally dependent MOs.

If, however, at step 122 it was determined that this MO was already involved in the localization of the faulty MO, then the program moves to step 125 where it is determined whether or not the MO fault state shows that the MO is failed. If the MO fault state shows that the MO is failed, the program moves to step 126 where the state is changed to "dependency." The program then moves to step 127 where the MO creates a unique fault identification, sends a secondary alarm notification, and sends a coordinate request to functionally dependent MOs. If, however, at step 125 it was determined that the MO fault state does not show that the MO is failed, then the program moves to step 128 where it is determined whether or not the MO fault state shows that the MO is degraded in capacity or service. If the fault state does not show that the MO is degraded, then the program returns to step 123. If, however, at step 128 it was determined that the fault state shows that the MO is degraded in capacity or service, then the program moves to step 129 where "affected" is added to the fault identification message to reflect the degraded status of the MO. The program then moves to step 127 where the MO creates a unique fault identification, sends a secondary alarm notification, and sends a coordinate request to functionally dependent MOs.

The program then moves to step 131 where it is determined whether or not the coordination request received at step 121 is the last answer from serving MOs to a localization request. If it is the last answer, then the program moves to step 132 where localization is unmarked in the MO fault state. If, however, the coordination request was not the last answer, then the program returns to step 121 to repeat the process.

Figure 13:
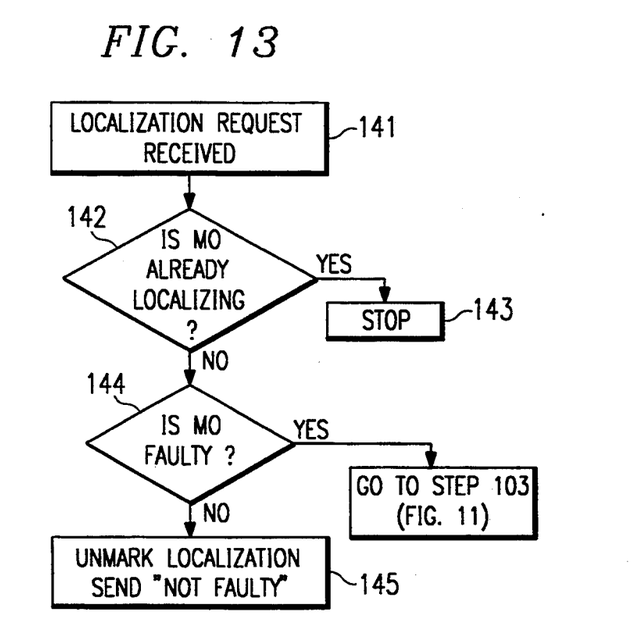
FIG. 13 is a flow chart of the steps taken by a server MO upon receipt of a localization request from a functionally dependent MO in one embodiment of the system of the present invention.

FIG. 13 is a flow chart of the steps taken by a server MO upon receipt of a localization request (from step 109 in FIG. 11) from a functionally dependent MO, at step 141. At step 142, it is determined whether or not the server MO is already involved in the localization of the faulty MO. If it is already involved, then the program moves to step 143 and takes no action.

If, however, at step 142 it is determined that the server MO is not already involved, then the program moves to step 144 where it is determined whether or not the MO is faulty by performing a function check. If the MO is faulty, the program returns to step 103 (FIG. 11) where the result of the function check is evaluated. If, however, at step 144 it was determined that the MO is not faulty, then the program moves to step 145 where localization is unmarked in the MO fault state, and a "Not Faulty" message is sent to the MO which is functionally dependent on this MO.

Figure 14:
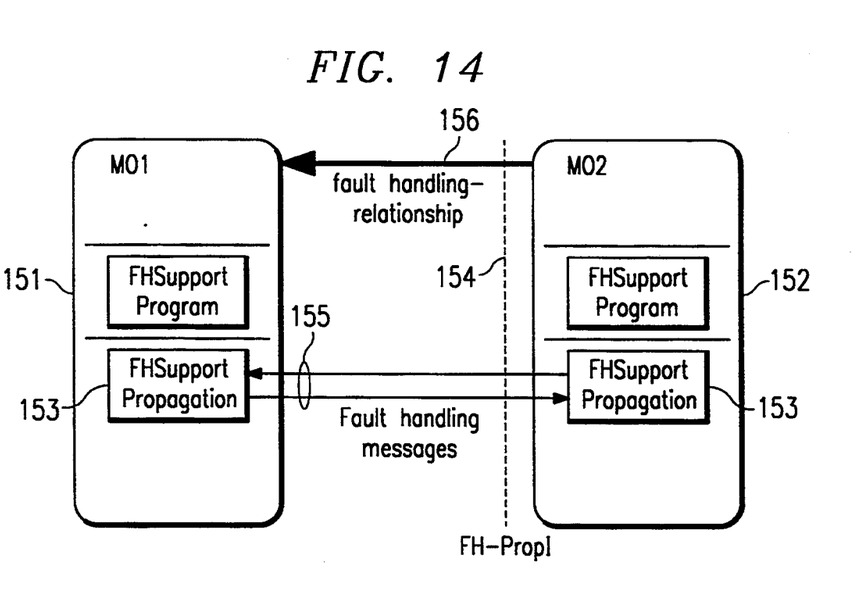
FIG. 14 is a block diagram illustrating the implementation of message sending services between two managed objects in one embodiment of the system of the present invention.

FIG. 14 is a block diagram illustrating the implementation of message sending services between two managed objects 151 and 152 in one embodiment of the system of the present invention. The FHSupport Propagations program 153 implements propagation services for the coordinate and the localize functions. It utilizes the interface FH-PropI 154 to send and receive fault handling messages 155 between related MOs. Several subroutines (methods) are used to implement the message handling services. When fault localization is required by a particular MO, a method "localize Faulty MO" is used. This method calls upon another subroutine "localize Faulty MO Received" in all the server MOs for this particular MO. The "Is Dependent Upon" and "Is Handled By" relationships 156 are used to direct the program to the proper server MOs. The method returns the number of related MOs to which the message was sent.

Another method, "coordinate Affected MOs," is used when coordination is required. This method calls upon another subroutine "coordinate Affected MOs Received" in all the functionally dependent MOs for this particular MO. Information about the fault identification is included. The "Is Dependent Upon" and "Is Handled By" relationships 156 are used to direct the program to the proper dependent MOs.

Another method, "coordinate Not Faulty," is used as an answer to a localization request when a server MO is operable. A final method, "Clear Fault," is used when the fault situation in an MO has been cleared. The method clears the fault indication from all MOs that are dependent on the once-faulty MO. The "Is Dependent Upon" and "Is Handled By" relationships 156 are used to direct the program to the proper dependent MOs.

It is thus believed that the operation and construction of the present invention will be apparent from the foregoing description. While the method and system shown and described have been characterized as being preferred, they are given by way of illustration and example only. It will be readily apparent that various changes and modifications could be made to the described invention without departing from the spirit and scope of the invention as defined in the following claims.

What is claimed is:

1. A model-based alarm coordination system for controlling the reporting of faults in complex electrical systems having a plurality of functionally related managed objects, said coordination system comprising:
   means for detecting out-of-specification performance in said plurality of functionally related managed objects;
   means for differentiating between managed objects which have out-of-specification performance due to internal faults, and managed objects which have out-of-specification performance due to faults in other of said functionally related managed objects; and
   means for localizing said managed objects with internal faults.

2. The alarm coordination system of claim 1 further comprising an operation support system providing management level control of said model-based alarm coordination system.

3. The alarm coordination system of claim 2 wherein said means for detecting out-of-specification performance includes a functional self-test program in each of said managed objects.

4. The alarm coordination system of claim 3 wherein said means for differentiating between managed objects includes:
   means for generating primary alarm notifications within said managed objects with internal faults;
   means for generating secondary alarm notifications within said managed objects which have out-of-specification performance due to faults in other of said managed objects;
   means within said managed objects for including fault identification messages in said primary alarm notifications and said secondary alarm notifications, said fault identification messages being generated in response to said managed objects sensing faults, and said fault identification messages identifying the generating managed object and the fault sensed; and
   means for transmitting said primary alarm notifications and said secondary alarm notifications from managed objects sensing faults to said operation support system.

5. The alarm coordination system of claim 4 wherein said means for localizing said faulty managed objects includes:
   means for establishing dependency relationships between said managed objects;
   means within said managed objects for generating requests to localize said faulty managed objects; and
   means for transmitting said requests to localize and fault identification messages from said faulty managed objects to managed objects with which said dependency relationships exist.

6. A model-based alarm coordination system for identifying and localizing faults in complex electrical systems having a plurality of functionally related managed objects, said coordination system comprising:
   means for generating primary alarm notifications within said functionally related managed objects which are fault-causing;
   means for generating secondary alarm notifications within said functionally related managed objects which are not fault causing, but are affected by said fault-causing managed objects;
   means within said functionally related managed objects for generating requests to coordinate said primary and secondary alarm notifications;
   means within said functionally related managed objects for generating fault identification messages in response to said managed objects sensing faults, said fault identification messages identifying the generating managed object and the type of fault sensed;
   means for establishing dependency relationships between said functionally related managed objects; and
   means for transmitting said fault identification messages from managed objects sensing faults to managed objects with which said dependency relationships exist, said fault identification message being transmitted in conjunction with said primary alarm notifications, said secondary alarm notifications, and said requests to coordinate.

7. The model-based alarm coordination system of claim 6 further comprising means within said managed objects for generating requests to localize said fault-causing managed objects, and said fault identification message being transmitted in conjunction with said requests to localize.

8. A method for controlling the reporting of faults in complex electrical systems having a plurality of functionally related managed objects, said method comprising the steps of:
   detecting out-of-specification performance in said plurality of functionally related managed objects;
   differentiating between managed objects which have out-of-specification performance due to internal faults, and managed objects which have out-of-specification performance due to faults in other of said functionally related managed objects; and
   localizing said managed objects with internal faults.

9. The method of claim 8 further comprising the step of providing an operation support system providing management level control of said model-based alarm coordination system.

10. The method of claim 9 wherein the step of detecting out-of-specification performance includes performing a functional self-test in each of said managed objects.

11. The method of claim 10 wherein the step of differentiating between managed objects includes:
   generating primary alarm notifications within said managed objects with internal faults;
   generating secondary alarm notifications within said managed objects which have out-of-specification performance due to faults in other of said managed objects;
   generating within said managed objects, fault identification messages in response to said managed objects sensing faults, said fault identification messages identifying the generating managed object and the fault sensed;
   including said fault identification message in said primary alarm notifications and said secondary alarm notifications; and
   transmitting said primary alarm notifications and said secondary alarm notifications from managed objects sensing faults to said operation support system.

12. The method of claim 11 wherein the step of localizing said faulty managed objects includes:
   establishing dependency relationships between said managed objects;
   generating within said managed objects, requests to localize said faulty managed objects; and
   transmitting said requests to localize and fault identification messages from said faulty managed objects to managed objects with which said dependency relationships exist.

13. A method for identifying and localizing faults in complex electrical systems having a plurality of functionally related managed objects, said method comprising the steps of:
   generating primary alarm notifications within said functionally related managed objects which are fault-causing;
   generating secondary alarm notifications within said functionally related managed objects which are not fault-causing, but are affected by said fault-causing managed objects;
   generating within said functionally related managed objects, requests to coordinate said primary and secondary alarm notifications;
   generating within said functionally related managed objects, fault identification messages in response to said managed objects sensing a fault, said fault identification message identifying the generating managed object and the type of fault sensed;
   establishing dependency relationships between said functionally related managed objects; and
   transmitting said fault identification messages from managed objects sensing faults to managed objects with which said dependency relationships exist, said fault identification message being transmitted in conjunction with said primary alarm notifications, said secondary alarm notifications, and said requests to coordinate.

14. The method of claim 13 further comprising the steps of:
   generating within s aid managed objects, requests to localize said fault-causing managed objects; and
   transmitting said fault identification messages in conjunction with said requests to localize.

* * * * *